(12) United States Patent
Vollmer et al.

(10) Patent No.: US 7,644,269 B2
(45) Date of Patent: Jan. 5, 2010

(54) METHOD OF CONTROLLING ACCESS

(75) Inventors: Vasco Vollmer, Holle (DE); Matthias Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 10/380,917

(22) PCT Filed: Sep. 11, 2001

(86) PCT No.: PCT/DE01/03474

§ 371 (c)(1), (2), (4) Date: Sep. 8, 2003

(87) PCT Pub. No.: WO02/23801

PCT Pub. Date: Mar. 21, 2002

(65) Prior Publication Data

US 2004/0073791 A1 Apr. 15, 2004

(30) Foreign Application Priority Data

Sep. 16, 2000 (DE) ................... 100 45 975

(51) Int. Cl.
*H04L 9/32* (2006.01)
*G06F 15/173* (2006.01)
*G06F 21/00* (2006.01)
*G06F 7/24* (2006.01)
*G06F 17/30* (2006.01)
*H04N 7/16* (2006.01)
*H04L 29/06* (2006.01)
*G08B 29/00* (2006.01)

(52) U.S. Cl. ............... 713/154; 713/168; 709/223; 726/27; 726/29; 726/34

(58) Field of Classification Search ............ 709/223; 726/27, 29, 34
See application file for complete search history.

(56) References Cited

U.S. PATENT DOCUMENTS

| 5,315,657 | A | | 5/1994 | Abadi et al. |
| 5,475,625 | A | * | 12/1995 | Glaschick ............. 709/224 |
| 5,563,946 | A | * | 10/1996 | Cooper et al. ............ 705/56 |
| 5,734,819 | A | * | 3/1998 | Lewis .................... 726/29 |
| 6,003,135 | A | * | 12/1999 | Bialick et al. ............. 726/29 |
| 6,012,100 | A | * | 1/2000 | Frailong et al. .......... 709/250 |
| 6,055,575 | A | | 4/2000 | Paulsen et al. |
| 6,070,243 | A | | 5/2000 | Bailey et al. |

(Continued)

FOREIGN PATENT DOCUMENTS

EP 0 924 900 6/1999

(Continued)

OTHER PUBLICATIONS

Alexander, D. Scott. Arbaugh, William A. Keromytis, Angelos D. Muir, Steve. Smith, Jonathan M. "Secure Quality of Service Handling". Communications Magazine, IEEE. Pub. Apr. 2000. Relevant pp. 106-112. Found on the World Wide Web at: http://ieeexplore.ieee.org/stamp/stamp.jsp?tp=&arnumber=833566&isnumber=18038.*

(Continued)

*Primary Examiner*—Taghi T. Arani
*Assistant Examiner*—Jeremiah Avery
(74) *Attorney, Agent, or Firm*—Kenyon & Kenyon LLP

(57) ABSTRACT

To control access to elements within a bus system or network, an external device identifies itself with a bus manager or network manager via a device-specific identifier. After authentication on the basis of a digital key, access is granted to the external device in accordance with its membership in a certain class of elements of the bus system or network.

15 Claims, 2 Drawing Sheets

| | | | | |
|---|---|---|---|---|
| 6,081,508 A * | 6/2000 | West et al. ............... 370/238 |
| 6,111,858 A * | 8/2000 | Greaves et al. ........... 370/256 |
| 6,170,060 B1 * | 1/2001 | Mott et al. ................. 726/29 |
| 6,226,752 B1 * | 5/2001 | Gupta et al. .................. 726/9 |
| 6,240,513 B1 * | 5/2001 | Friedman et al. ......... 713/152 |
| 6,335,927 B1 * | 1/2002 | Elliott et al. .............. 370/352 |
| 6,396,815 B1 * | 5/2002 | Greaves et al. ........... 370/256 |
| 6,468,160 B2 * | 10/2002 | Eliott ........................ 463/43 |
| 6,496,858 B1 * | 12/2002 | Frailong et al. ........... 709/221 |
| 6,507,908 B1 * | 1/2003 | Caronni ..................... 713/153 |
| 6,938,154 B1 * | 8/2005 | Berson et al. .............. 713/156 |

FOREIGN PATENT DOCUMENTS

| | | |
|---|---|---|
| EP | 0 939 519 | 9/1999 |
| WO | WO 98/26548 | 6/1998 |
| WO | WO 98 26548 | 6/1998 |

OTHER PUBLICATIONS

The HAVi Specification 1.0, HAVi Organization, Jan. 18, 2000, pp. 1-467.

IEEE, "P1394a Draft for a High Performance Serial Bus (Supplement)", Amendment to IEEE Std 1394-1995, Jun. 20, 2000, pp. 1-196.

Andrew S. Tanenbaum, "Computer-netzwerke", Prentiss Hall, 1998, pp. 526-529.

* cited by examiner

METHOD OF CONTROLLING ACCESS

FIELD OF THE INVENTION

The present invention relates to a method of controlling access to elements within a bus system or network.

BACKGROUND INFORMATION

A serial bus system is known from IEEE standard 1394 [1], in which a plurality of terminals (nodes) are connected either via a 4-6-strand cable or an optical fiber. At least one node may be designed so that it is able to assume additional administrative functions for the network (bus management).

In addition to the above standard, there is the bus-independent expansion specification known as HAVi (Home Audio Video interoperability) [2]. The HAVi specification describes remote control of devices using a resource manager which seizes a resource (device) on request and also releases it again.

The HAVi specification describes a distributed model in which devices are controlled by control modules, also known as device control modules (DCM). DCMs run as software elements on the device which is to perform control functions on another device. A DCM is specific for a certain device or a class of devices.

The HAVi standard offers the possibility of allocating two different security levels to one software element. A software element is classified as "trusted" if it has been adequately tested by the manufacturer. In the case of software elements which must be dynamically loaded into the system, the authenticity of the software element must be verified by a digital signature. All DCMs must have a "trusted" status. Software elements designated as "untrusted" are all of those not marked as "trusted" by the manufacturer. On the basis of this classification, the recipient of a request decides whether to trust the sending software element, i.e., even an "untrusted" software element may send requests, but it is not certain whether its request will be met.

SUMMARY OF THE INVENTION

In accordance with the present invention, it is possible to provide a security function which ensures greater security, in particular for use in heterogeneous networks, e.g., in a motor vehicle, than is possible with the HAVi standard. In particular, the present invention is suitable in communication with and among software elements over different bus and/or network technologies. An unambiguous identification of devices and/or software elements within a network, operating according to the HAVi standard is achieved, for example. A device or software element is recognized on the basis of a device-specific identifier, as a device belonging to a certain class. The authenticity of a device and/or software element is ascertained on the basis of a digital key. After authentication, the device is granted access to elements of the bus system or network in accordance with its class membership.

In accordance with the present invention, it is advantageous for an external device to log in at a gateway via a log-in message which is transmitted in particular together with the device identifier to the bus manager or network manager.

In accordance with the present invention, in addition to the device-specific identifier, a device class identifier on the basis of which access may be controlled is also transmitted.

Due to the joint key agreement in accordance with the present invention, using in particular the Diffie-Hellman key exchange, it is impossible for a third party to find out this key.

In accordance with the present invention, authentication is performed by the challenge-response method in accordance with the joint key agreement.

In accordance with the present invention, signal conversions according to the ISO/OSI layer model may be performed in both the physical layer and in higher layers, e.g., address conversions.

In accordance with the present invention, the gateway may be equipped to advantage with a firewall functionality to prevent unauthorized access from another network.

In accordance with the present invention, the authentication may be used to ascertain which resources of the bus system or network may be and/or controlled by an external device and the manner in which this may take place.

In accordance with the present invention, the bus manager or network manager may configure the firewall functionality to advantage on the basis of the access authorization determined by it, so that the firewall functionality is responsible for enabling or blocking resources in the bus system or network.

In accordance with the present invention, enabling or blocking may be performed to advantage on the basis of the source address or destination address of a data packet.

In accordance with the present invention, the firewall functionality may filter certain commands of an external device according to the access authorization thus determined.

In accordance with the present invention, instead of fixed allocations of the access authorization by the bus manager or network manager, the access authorization may also be negotiated.

Instead of an external device, in accordance with the present invention, a completely external bus system or network may also establish a communication link to gain access to elements of the bus system or network.

DETAILED DESCRIPTION

The present invention is illustrated on the basis of the serial bus system according to the IEEE standard 1394 [1], reference also being made to the expansion according to HAVi specification [2]. Before the actual explanation of the present invention, the IEEE standard 1394 and the HAVi specification will be discussed to facilitate an understanding. In addition, a few terms will be explained.

Figure 1:
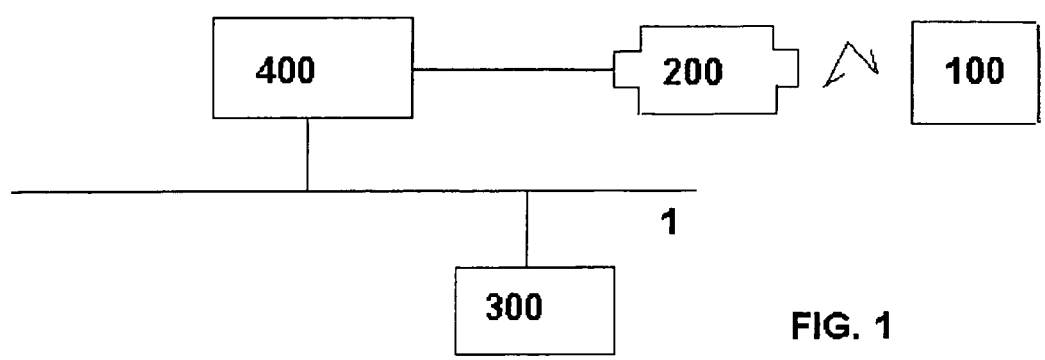
FIG. 1 shows the network topology of a bus system.

The various terminals (nodes) are connected either via a 4-6-stranded cable or an optical fiber 1 according to FIG. 1. A node may optionally be designed as a terminal (leaf) 200 or as a relay node (branch) 300, 400. The top node is called the root. Due to the use of different types of nodes, a suitable topology of the network may be constructed. A leaf receives information packets and processes them if the destination address of the packet matches its own. A branch must additionally send all the packets it receives at one port to all the other ports.

According to IEEE 1394, the network is self-configuring, i.e., after being turned on or after a reset, all the nodes send out selected information about themselves into the network. This information is received by all nodes. A node may be designed in such a manner that it is able to assume additional administrative functions for the network (bus management). To do so, it collects all the information from the other nodes, processes it and stores it internally in a suitable way. If a plurality of nodes have bus management capabilities, there is a competition procedure from which one node emerges as the victor and then assumes the function of bus management.

In addition to the methods described in the IEEE 1394 specifications, there is the bus-independent expansion HAVi which is suitable for use in an IEEE 1394 network. In particular, remote control of devices from any other point in the network is described in the HAVi specification. To do so, a distributed model is described, in which control of the devices is performed by control modules, called device control modules (DCM). These DCMs run as software elements on the device which wants to perform control functions on another device. Each DCM is specific for a certain device or a class of devices. Another group of software elements are the "functional component modules" a plurality of which may be arranged in a hierarchy beneath a DCM and are responsible for control of a specific functional part of a device.

The function of a gateway is to connect two networks together. A distinction is made as to the network layer on which this connection is performed (see ISO/OSI layer model). Thus, a gateway which includes only the first layer (physical layer) is essentially only a converter of physical givens, i.e., an electro-optical converter, and the actual data are not altered there. A gateway which also includes higher layers additionally interprets certain data fields and, if necessary, alters them in accordance with the requirements of the destination system, e.g., an address conversion of the destination address and source address may be performed if the two connected networks use different addressing schemes.

A firewall protects the network from unauthorized access from another network, e.g., from one subnetwork to another subnetwork.

In authentication, a communication participant provides evidence of its own identity to another communication participant.

The globally unique identifier (GUID) is a number specified in the IEEE 1394 standard composed of a 24 bit-long manufacturer identification and a 40 bit-long number selectable by the manufacturer. The manufacturer identification is assigned unambiguously by the IEEE on request. The GUID is stored in a fixed manner in a device that conforms to IEEE 1394 standard and identifies it unambiguously.

The model ID is a 24 bit-long data field with which the manufacturer of a device may identify its belonging to a certain class or family of devices.

The method according to the present invention is used in performing the authentication of a device connected to a vehicle network, for example. In general, an internal network is provided with an external terminal supplied via a gateway. This terminal is subsequently designated as a user port. The gateway is necessary to perform first the physical conversion, i.e., for example conversion from an internal optical fiber to an external electrical or wireless connection and on the other hand to form a protocol conversion, if necessary. In addition, under some circumstances integration of a firewall is desired to ensure the security of the internal network.

Secure authentication of the device connected, as well as the network itself, must be performed because devices that exchange sensitive data with the internal network, e.g., a repair shop diagnostic device, may also be connected to the user connection. The method according to the present invention uses a mechanism for secure exchange of a key known as the Diffie-Hellmann key exchange (see [3], chapter 7.1.5.2). In addition, an authentication procedure known as the challenge-response procedure is also used ([3], chapter 7.1.5.1).

Figure 2:
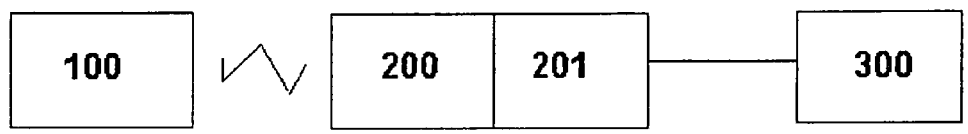
FIG. 2 shows different network elements.

Let us assume three participating instances (FIG. 2). External device 100 is connected to the user terminal, which is connected to internal network 1 of the vehicle via gateway 200. In this network, the bus master, i.e., bus manager or network manager 300, functions as a central control instance which also monitors in particular the authenticity of devices connected to it.

Figure 3:
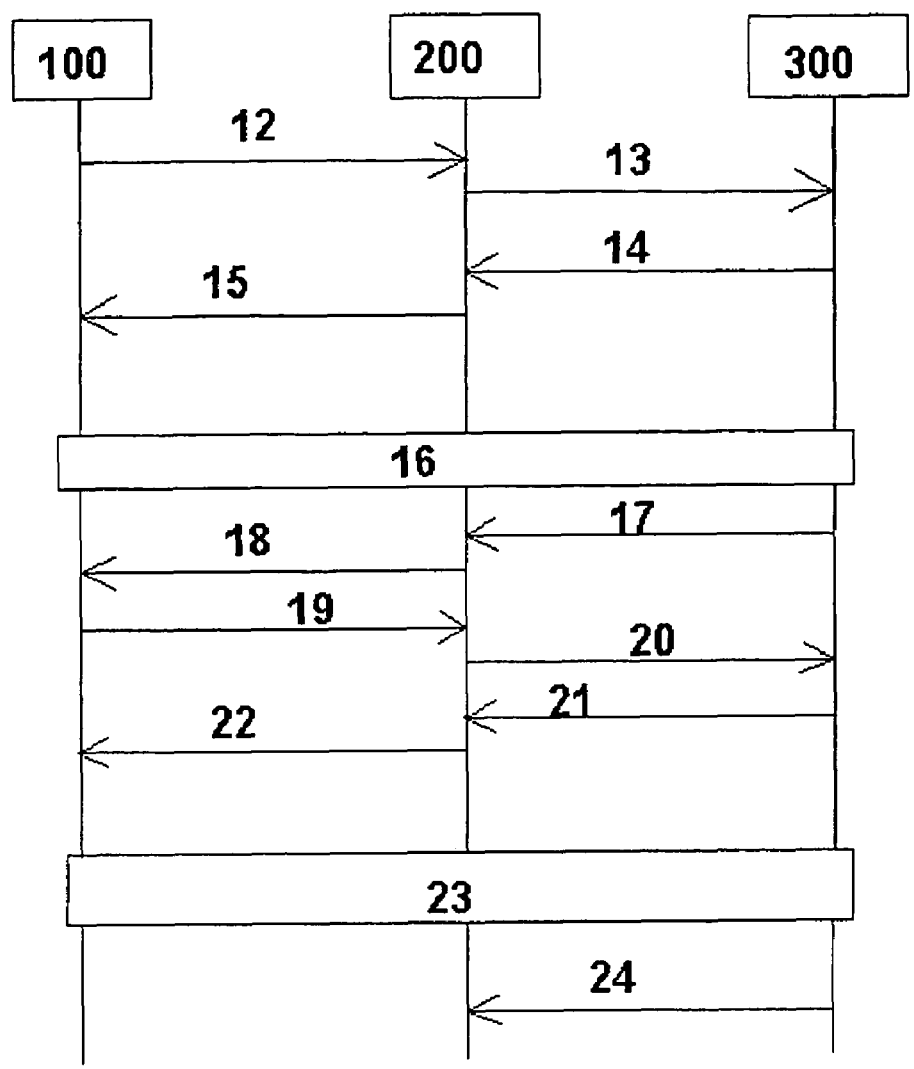
FIG. 3 shows the authentication on the bus manager.

After connecting external device 100, it logs in at gateway 200. With this log-in message 12 (FIG. 3), device 100 transmits its GUID and advantageously also transmits its model ID. In addition, the message also contains a primary number n for which it holds that (n−1)/2 is also a primary number, and a primary number g. In addition, the device selects internally a random number x. In addition to n and g, the result of the operation ($g^x$ mod n) is also transmitted to gateway 200. The gateway receives all these parameters and forwards them to internal bus manager 300 (13). Bus manager 300 then in turn selects a random number y and calculates the result of the operation ($g^y$ mod n) on the basis of the values transmitted by device 100. This result is relayed to the gateway (14) and from there to device 100 (15). With the help of the results of these two operations, both external device 100 and bus manager 300 are now able to calculate the result of the operation $K_{EB}=(g^{xy}$ mod n). This result $K_{EB}$ is subsequently used as the joint key (16) for the following authentication. This possibility of determining a joint key without a third party being able to find it out is known as the Diffie-Hellmann key exchange.

Since there is a joint key (16) in both the external device 100 and in bus manager 300, the authentication is performed according to the challenge-response procedure, whereby bus manager 300 generates a random number $R_B$ (the challenge) and sends (17, 18) it to external device 100. External device 100 encrypts the challenge with joint key $K_{EB}$ and sends the result (19) via gateway 200 back (20) to the bus manager (response). In addition, this message contains a random number $R_E$ which is sent as a challenge to the bus manager which then checks on whether random number $R_B$ has been encrypted using correct key $K_{EB}$. After verification, the bus manager encrypts challenge $R_E$ likewise with key $K_{EB}$ and sends the result (21, 22) to external device 100 which in turn checks on the validity of the result. If both checks have yielded a correct result, then both communication partners (device 100 and bus manager 300) are authenticated. The bus manager may then allow or block access to certain resources of the network on the basis of the manufacturer's ID contained in the GUID, on the basis of the serial number contained in the GUID or, especially advantageously, the model ID.

A gateway 200 especially advantageously also contains a firewall functionality 201 in addition to the conversion of physical givens and/or protocols. In an especially advantageous manner, the method of authentication described above is used to determine which resources an external device may use and/or control and what the manner in which this may take place.

On the basis of the manufacturer's ID (vendor ID) contained in the GUID and/or the serial number and/or additional model ID, bus manager 300 recognizes which device or which type of device the external device is. According to an internal method, bus manager 300 defines the access authorizations to network elements for this device 100. On the basis of the access authorizations thus determined, bus manager 300 configures (24) firewall module 201 within gateway 200 so that it blocks or opens in accordance with the authorizations thus determined. Authorization may be based on the source address of a data packet, i.e., the address of origin of a data packet, or on the destination address of a data packet. Filtering of certain commands is possible but more complex. In this case, however, the firewall must analyze the data packet in great detail.

In the exemplary embodiment according to FIG. 2, an external device 100 is connected to on-board network 1 in a vehicle via a wireless interface of a gateway 200. At least one device 300 characterized as the bus manager (bus master) and one other device 400 are included in the on-board network.

In this example, it is assumed that the external device is a repair shop diagnostic device. This diagnostic device includes a function which permits communication with on-board device 400 and readout and alteration of the settings on this device, e.g., a central control unit. These changes may have an influence on the functioning of the device or the vehicle in the event of faulty operation, so authentication is necessary for access to this control unit, i.e., the diagnostic device gains access to the control unit only when the device and/or the user has been authenticated with respect to bus manager 300. For this purpose, the diagnostic device and the bus manager first exchange a set of keys to perform the following authentication. Authentication is subsequently performed. After successful authentication, the bus manager decides which type of access the diagnostic device will gain to the elements of the on-board network, and it configures firewall module 201 within gateway 200 accordingly. In this example, the bus manager recognizes an authorized diagnostic device of the vehicle manufacturer and allows full access to all devices of the network. Then, it is possible, e.g., to update the operating software or application software or to perform an error diagnosis on the system.

In another exemplary embodiment according to FIG. 1, the externally connected device is in this case not an authorized diagnostic device but instead is a handheld computer with which a user would like to transfer information to a device such as navigation device 400 installed in the vehicle. After the authentication procedure, bus manager 300 in firewall module 201 for external device 100 enables access only to navigation device 400 with the control commands required for data exchange. Access to other devices or other commands in the external device is not possible because they are blocked by the firewall module.

As an alternative, access authorizations may be negotiated between bus manager 300 and external device 100. In this case, the external device may request certain access authorizations, which the bus manager may then grant or reject.

Instead of an external device 100 connected to gateway 200, an external network which would like to establish a communication link with the network may also be connected. The procedures for identification and authentication then take place as described above. The network may of course also have a plurality of gateways via which the plurality of devices or networks are connected and access the bus system or network either simultaneously or in a staggered order. In particular in the case of simultaneous access requests to the same resource, bus manager 300 will grant access according to previously defined priorities or by negotiation.

REFERENCES

[1] IEEE, "P1394a Draft for a High Performance Serial Bus (Supplement)"
[2] HAVi Organization, "The HAVi Specification 1.0"
[3] Andrew S. Tanenbaum, Computernetzwerke [Computer Networks], Prentice Hall, 1998

What is claimed is:

1. A method of controlling access to an element within one of a bus system and a network, comprising:
identifying an external device that establishes a communication link with the one of the bus system and the network via a gateway, the external device being identified by a device-specific identifier transmitted to one of a bus manager and a network manager, wherein one of the device-specific identifier and a data record allocated to the device-specific identifier contains information regarding a class membership of the external device, wherein the information includes at least one of:
a manufacturer identifier that identifies a manufacturer of the external device,
a model identifier that identifies a model of the external device, or
a serial number of the external device;
authenticating the external device on the basis of a digital key; and
after the authenticating, granting the external device access to the element of the one of the bus system and the network in accordance with the class membership, wherein a scope of the access to the element varies depending on the class membership of the external device.

2. The method as recited in claim 1, wherein:
for the access, the external device logs in at the gateway using a log-in message that is transmitted, together with the device-specific identifier, to the one of the bus manager and the network manager, and wherein the external device further transmits a device class identifier in addition to the device-specific identifier.

3. The method as recited in claim 1, wherein:
a joint key agreement is reached between the external device and the one of the bus manager and the network manager.

4. The method as recited in claim 3, wherein:
the joint key agreement is reached through an exchange of parameters including primary numbers, random numbers, and operations performed on the primary numbers and the random numbers.

5. The method as recited in claim 3, wherein:
the Diffie-Hellmann technique is used for the joint key agreement.

6. The method as recited in claim 3, further comprising:
after the joint key agreement between the external device and the one of the bus manager and the network manager, authenticating according to a challenge-response procedure.

7. The method as recited in claim 2, wherein:
the gateway is set up to perform a signal conversion according to the ISO/OSI layer model in at least one of a physical layer and a higher layer.

8. The method as recited in claim 2, wherein:
the gateway is set up to have a firewall functionality.

9. The method as recited in claim 8, wherein:
the authenticating is used to ascertain which resources of the one of the bus system and the network may be at least one of used and controlled by the external device and in what manner this may be done.

10. The method as recited in claim 8, further comprising:
causing the one of the bus manager and the network manager to configure the firewall functionality on the basis of an access authorization determined thereby, so that the firewall functionality performs one of an enabling and a blocking of a resource of the one of the bus system and the network according to the access authorization thus determined.

11. The method as recited in claim 10, wherein:
the one of the enabling and the blocking is performed on the basis of one of a source address and a destination address of a data packet.

12. The method as recited in claim 10, wherein:
the firewall functionality filters certain commands of the external device according to the access authorization determined.

13. The method as recited in claim 10, wherein:
the access authorization is negotiated between the external device and the one of the bus manager and the network manager.

14. The method as recited in claim 1, wherein:
instead of the external device, one of an external bus system and an external network establishes a communication link with the one of the bus system and the network to gain access to the element of the one of the bus system and the network.

15. The method as recited in claim 1, wherein:
in addition to the external device, one of an external bus system and an external network establishes a communication link with the one of the bus system and the network to gain access to the element of the one of the bus system and the network.

* * * * *

UNITED STATES PATENT AND TRADEMARK OFFICE
CERTIFICATE OF CORRECTION

PATENT NO. : 7,644,269 B2  Page 1 of 1
APPLICATION NO. : 10/380917
DATED : January 5, 2010
INVENTOR(S) : Vollmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 675 days.

Signed and Sealed this

Sixteenth Day of November, 2010

David J. Kappos
*Director of the United States Patent and Trademark Office*